May 17, 1960  J. I. HAASE  2,936,813
TIRE BAND APPLYING MECHANISM AND METHOD
Filed Nov. 16, 1954  6 Sheets-Sheet 1

INVENTOR.
JORGEN I. HAASE
BY
*R. L. Miller*
ATTORNEY

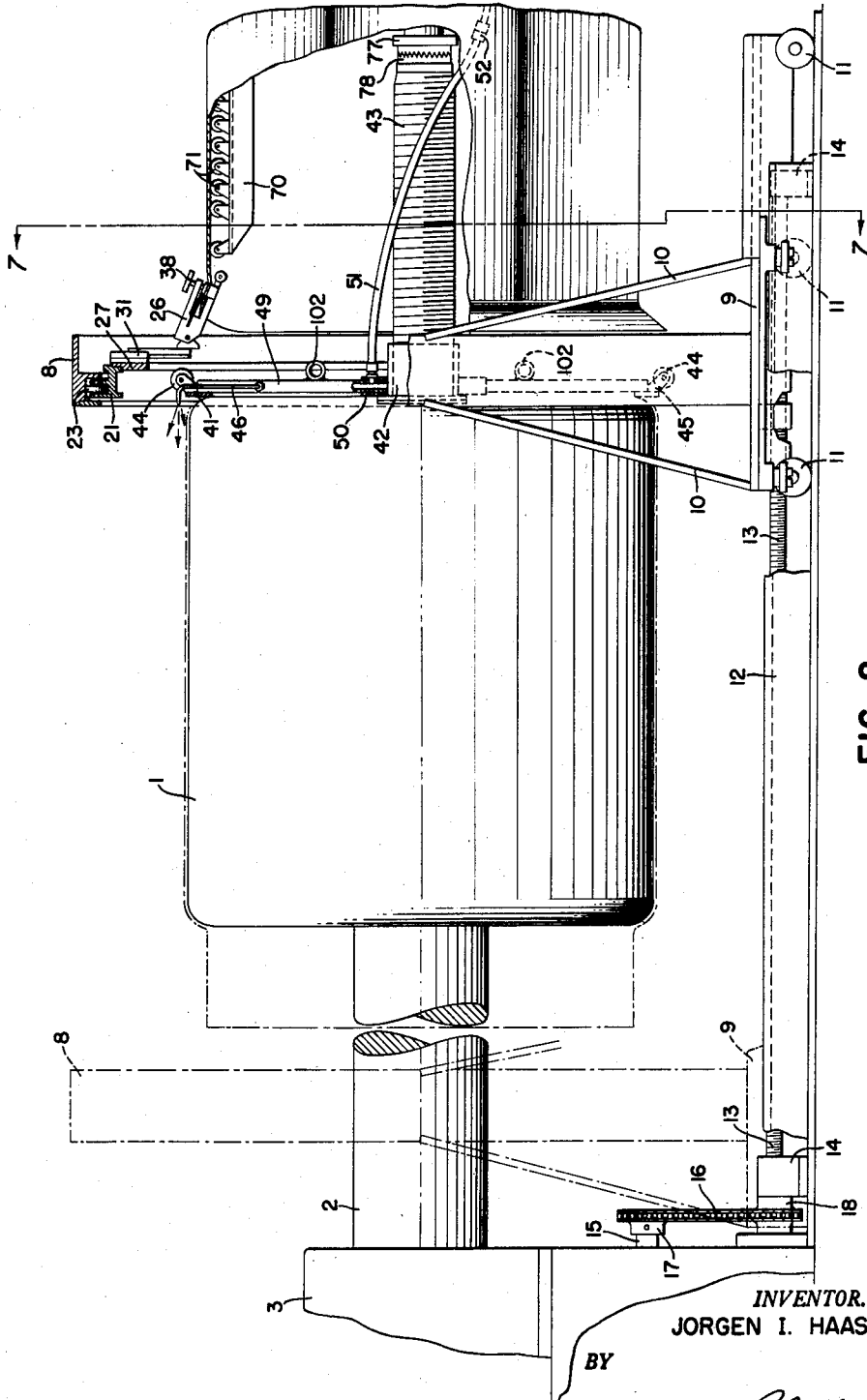

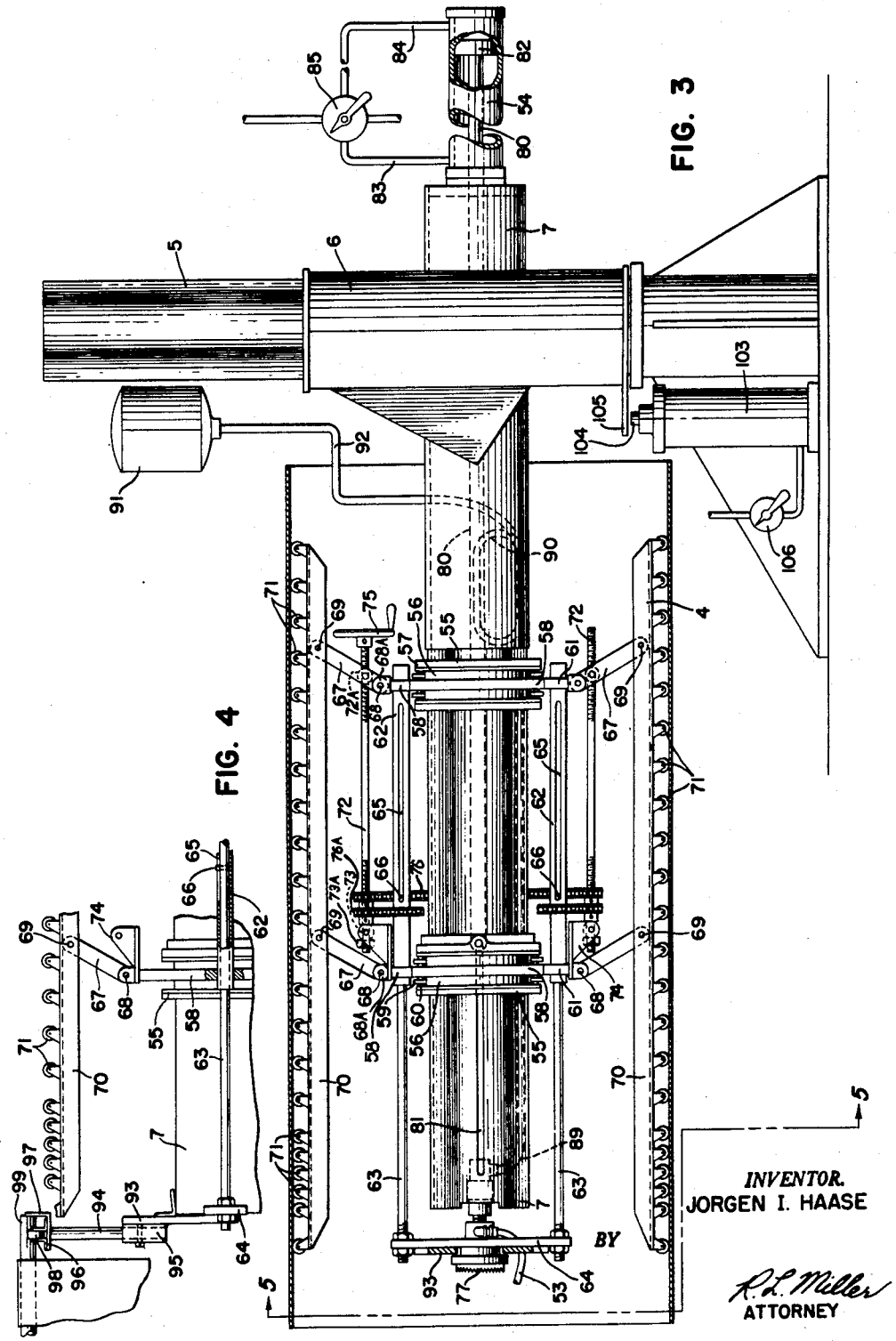

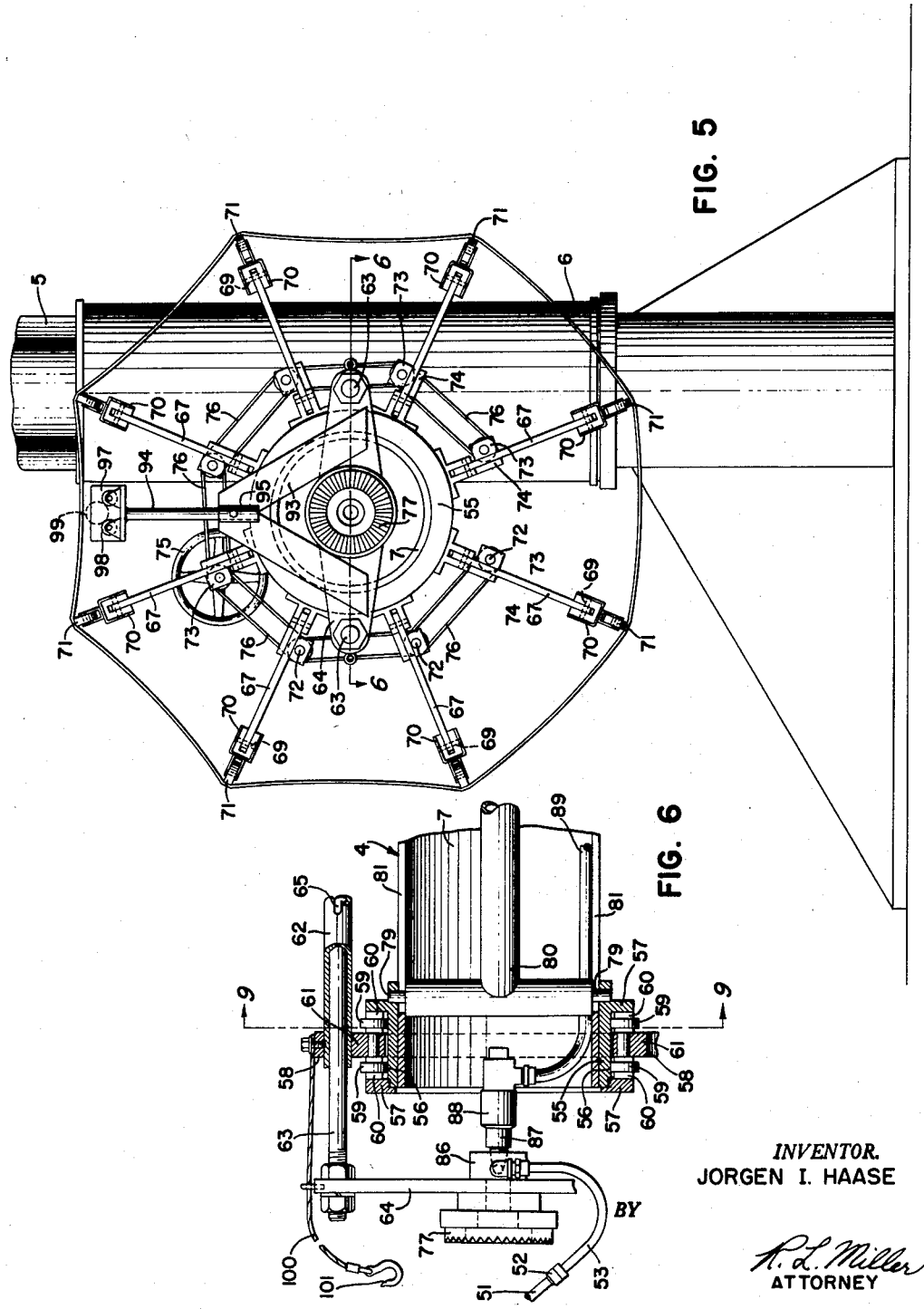

May 17, 1960 J. I. HAASE 2,936,813
TIRE BAND APPLYING MECHANISM AND METHOD
Filed Nov. 16, 1954 6 Sheets-Sheet 5

*INVENTOR.*
JORGEN I. HAASE
BY
*R. L. Miller*
ATTORNEY

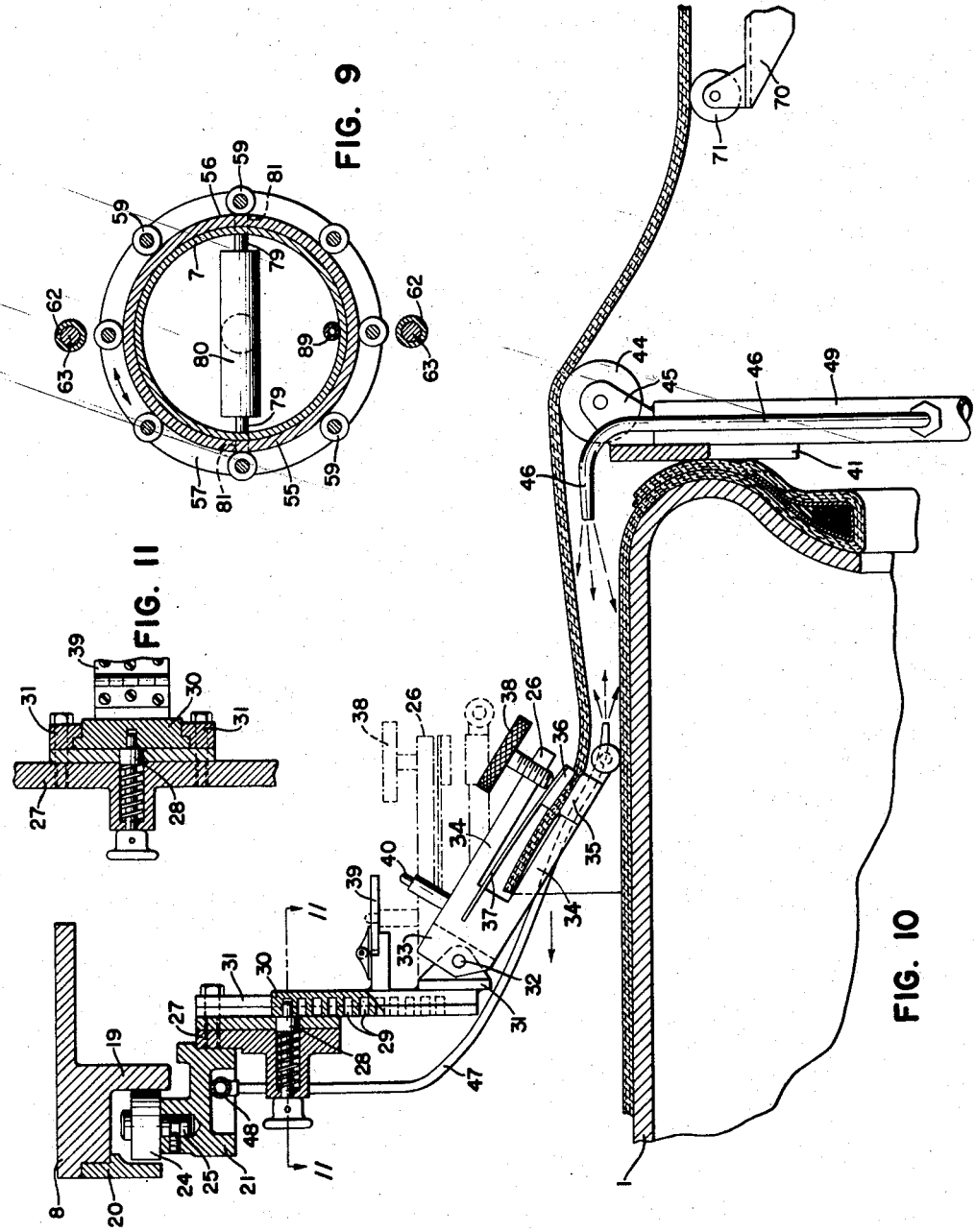

United States Patent Office 2,936,813
Patented May 17, 1960

2,936,813

TIRE BAND APPLYING MECHANISM AND METHOD

Jorgen I. Haase, Akron, Ohio, assignor to The Goodyear Tire & Rubber Company, Akron, Ohio, a corporation of Ohio Application November 16, 1954, Serial No. 469,127

27 Claims. (Cl. 154—9)

The present invention relates to a means and method for applying tire bands to tire building drums and particularly to the application of multi-ply bands.

Another object of this invention is to provide a very simple method of applying bands directly to a building drum while stretching the band in this operation so that the band will slip readily over the tire-building drum or previous bands that have been applied thereto.

It is to be understood that the invention primarily is designed for the application of bands which normally are built to a smaller diameter than that of the building drum and then stretched on to the drum. The manufacture of such bands to a smaller diameter is highly desirable, particularly with respect to tires which are of relatively large cross section and comparatively small bead diameter. The reasons for doing this are well understood in the tire industry by those skilled in the art and numerous methods have been suggested for the application of such bands to a tire-building drum.

A further object of this invention is to provide a band application apparatus and method which provides for a substantially uniform stretching of the band throughout the periphery thereof so that when the band is finally applied to the tire-building drum that band will have all of the cords therein arranged at substantially the same angle with respect to the center line of the drum.

A further object of this invention is the provision of an apparatus and method for applying such bands while simultaneously stretching the band by closely spaced stretching means so that the uniformity of the stretching will be maintained.

Another object of the invention is to provide novel band-supporting means to be coupled with the tire drum to rotate therewith, such means including suitable anti-friction means to permit the bands to be easily applied to the supporting means and to be transferred from said supporting means to the drum.

Other objects of this invention will appear hereinafter as the description of the invention proceeds, the novel features, arrangements and combinations being set forth in the specification and in the claims thereunto appended.

In the drawings,

Fig. 2 is an elevation showing the tire-building drum and a portion of the band-stretching mechanism with the parts in the position occupied at the beginning of the stretching and applying operation.

Fig. 3 is an elevation of the band-holding device for holding the band in a position to be applied to the tire-building drum, a substantial portion of the device being shown in vertical section.

Fig. 4 is a fragmentary view of the mechanism shown in Fig. 3 with the parts thereof being shown in elevation rather than in cross section. In this view the rotatable band-holding device is shown rotated to a position at 90° from that illustrated in Fig. 3.

Fig. 5 is a section taken along the line 5—5 in Fig. 3.

Fig. 6 is a fragmentary view partly in section taken on the line 6—6 of Fig. 5 showing a detail of the apparatus.

Fig. 9 is a cross section taken on the line 9—9 in Fig. 6.

Fig. 10 is a fragmentary elevation partly in cross section showing the position of the parts in the first stage in the application of a band to the tire drum; and Fig. 11 is a cross section on the line 11—11 of Fig. 10;

As is well understood in the art, it is important in building certain types of tires on building drums that the tire band or bands be initially formed to a smaller diameter than the outer diameter of the building drum and then subsequently stretched to a size large enough to slip over the building drum, either prior to the application thereof or during the application thereof. It is not believed to be necessary for the purpose of describing this invention to go into the technical explanation of why this is desirable except to state that by so doing among other things better cord angles and spacing are maintained.

Essentially the present invention comprises a mechanism for holding a band in spread formation, that is in a generally annular shape and this is positioned adjacent the end of the drum in axial alignment therewith, whereafter one edge of the band is gripped by suitably clamping means along the edge thereof adjacent the drum, and thereafter these clamping means are caused to be moved axially toward and over the surface of the drum while expanding means engages the inner surface of the band and the clamping means at a multiplicity of closely spaced points so that the band is stretched uniformly. Simultaneously it is preferable that a cushion of air under super-atmospheric pressure be provided between the band and the surface of the drum or a preceding band so that the material in the band, which is at this stage quite tacky, will not stick to the drum or a previous band applied to said drum and interfere with the application of the band.

In the early application of such bands to tire-building drums it was necessary to limit the thickness of the bands so that they could be stretched manually without too much effort and would not weigh too much to thus increase the difficulties encountered in handling and applying the band to the drum. With the present invention the band is supported on a carrier in axial alignment with the drum and the band is continuously supported during its application. It is to be understood that once the band is released from its stretching mechanism, whatever that may be, the band will tend to return to its original diameter so that it will snugly embrace the drum or a previous band applied thereto. It is therefore important that the band, after it is stretched, be applied immediately and quickly to the drum so that it will not contract and make application difficult. At the same time, it is desirable not to stretch the band too much, as too much stretching may destroy the structure of the band, for it will be understood that at this stage of the process the band which comprises several layers, each having cords embedded in rubber, is unvulcanized and the rubber is still in its uncured state and the bond between the cords could be easily disrupted by too much stretching.

Figure 1:
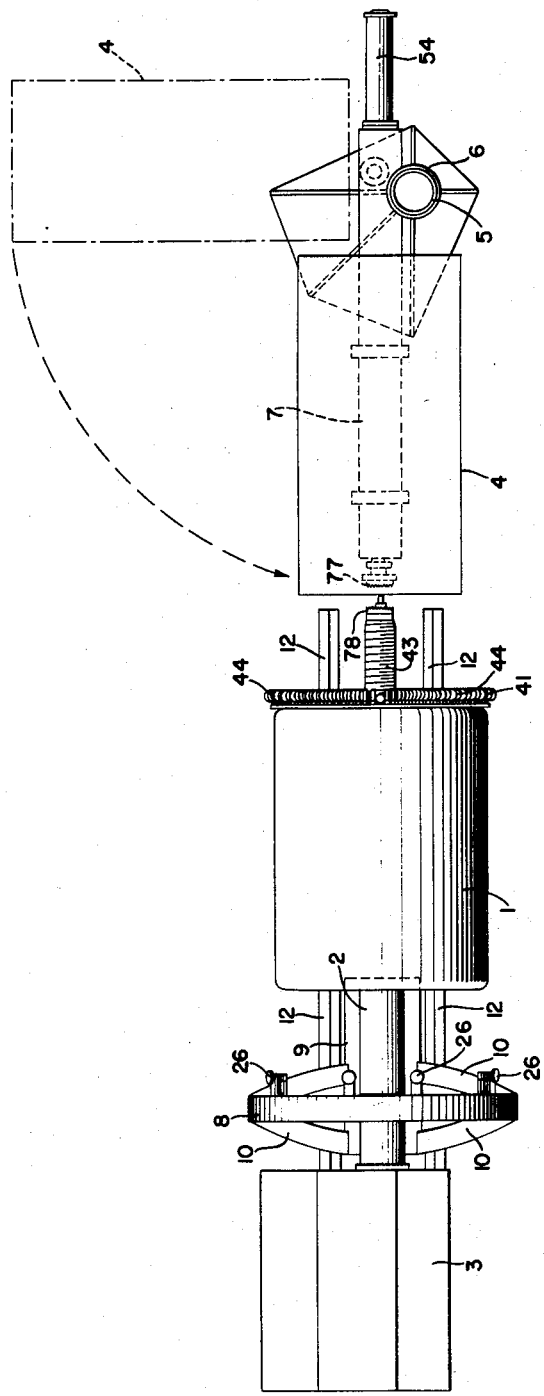
Fig. 1 is a plan view, more or less diagrammatic in character, showing the various elements of the band application mechanism and the tire-building drum to which the band is to be applied.

In Fig. 1 the reference numeral 1 designates a building drum of the desired type and this is mounted on a shaft 2 rotatably supported by suitable framework 3 and rotatable by any suitable mechanism, such as an electric motor provided with suitable controls. In this view the band-holding or carrying device is generally designated by the reference character 4 and this is shown only diagrammatically in this figure and without certain details thereof which are shown elsewhere. This is shown in full lines in alignment with the drum and in dotted lines at an angle of 90° with respect thereto, at which position the tire band is mounted thereon, after which the band-holding mechanism is rotated into the full-line position shown in Fig. 1. For these purposes the band-holding mechanism is mounted on a post 5 in the manner best illustrated in Fig. 3. Essentially the mounting comprises a sleeve 6 embracing the post and to this is welded a horizontally extending sleeve 7 on which the band-holding mechanism is supported and on which it rotates.

At the left in Fig. 1 there is shown a ring applicator 8, designed to carry the clamps, and the ring is mounted on a base 9 shown in Fig. 2 and is braced as by the members 10 extending upwardly from the base to a point about half way of the vertical height of the ring. This is purely a bracing means and it is to be understood that essentially there is a ring to which the clamping means is to be applied and this is mounted on a base which is positively driven for movement parallel to the axis of the drum.

The base 9 is mounted on small wheels 11 which support the weight of the ring and these wheels operate in channel guides 12 which have the opposite sides of the channel under and over the wheels to guide the same in a fixed path and to prevent tilting of the ring. These channels are generally mounted on the floor. Obviously, however, other means can be employed to guide the ring but that shown has been found to be simple and efficient for this purpose.

In order to move the ring applicator longitudinally, a threaded drive shaft 13 is mounted between the channels 12 and parallel thereto and supported at the opposite ends by suitable bearings 14. The end of the shaft at the left in Fig. 2 is coupled to a driving shaft 15 by a suitable chain 16 trained over sprockets 17 and 18 on the shafts 15 and 13, respectively. A suitable clutch means, not shown, is provided for connecting the shaft 15 to the driving mechanism. Since the ring 8 carries the clamping means which grip the band to be applied, it is obvious that this ring as it advances to the left in Fig. 2 will draw the band in that direction and during this operation it is desirable to expand the band and provide a cushion of air at super-atmospheric pressure between the band and the drum until the band is centered over the drum surface.

Referring now particularly to Figs. 2, 7, 8 and 10, it will be noted that the ring 8 has a fixed inwardly extending flange 19 and a removable flange 20 secured thereto so as to form a channel. An inner ring 21 has outwardly projecting annular flanges 22 carrying a series of supporting rollers 23, whereby the ring 21 may be rotated within the ring 8 and, as shown particularly in Fig. 10, other rollers 24 mounted on studs 25 on ring 21 are adapted to engage the flanges 19 and 20 on ring 8 and these are thrust rollers which take the axial thrust resulting from the movement of the ring 8 in an axial direction during the application of the band. Essentially the mechanism just described consists of one ring mounted for rotation within another ring with suitable guiding means for easy operation.

A series of clamping means, generally designated as 26, are mounted on a face of the ring 21 in circumferentially spaced relation. It has been found that eight of these clamping means spaced equally from each other are sufficient but, depending on the size of the tire, more or less such clamping means could be provided. The details of the clamping means and its mounting means are best illustrated in Figs. 10 and 11.

A bracket 27 is mounted on the ring 21 and this is provided with a spring-pressed detent member 28 which is adapted to project into a selected one of a series of openings 29 in a bracket 30 which pivotally carries the clamping member 26 at its end. The purpose of the detent 28 is merely to provide for radial adjustment of the bracket 30 and consequently of the clamp 26. The bracket 30 is guided in any suitable channel means, such as 31, and if desired, in order to provide rigidity, suitable means may be provided for positively locking the bracket 30 solidly on the bracket 27.

The lower end of the bracket 30 carries a pivot support 31 which has a pivot 32 thereon extending through the body 33 of the clamp 26. This permits radial movement of the clamping means for tires of different diameters or to stretch the band more or less as required. The clamp itself is provided with spaced arms 34, between which the edge of the fabric band is inserted, and clamping jaws 35 and 36 carried by the arms 34 are adapted to grip the fabric, the jaw 36 being mounted on a spring 37. A thumb screw 38, mounted on the upper arm 34 and engaging the end of the spring 37, is employed to move the clamping jaw 36 toward the jaw 35 to clamp the edge of the band between the jaws 35 and 36 so that the band will move with the ring as it is moved along its path. During certain stages, as when returning the ring to its initial position after application of a band, it is desirable that the clamping member be held out of operative position and for this purpose a spring-pressed latch member 39, having a perforation for receiving the pin 40, is provided so that the clamp may be held in the dotted-line position shown in Fig. 10. Any suitable means can be used for this purpose.

Figure 7:
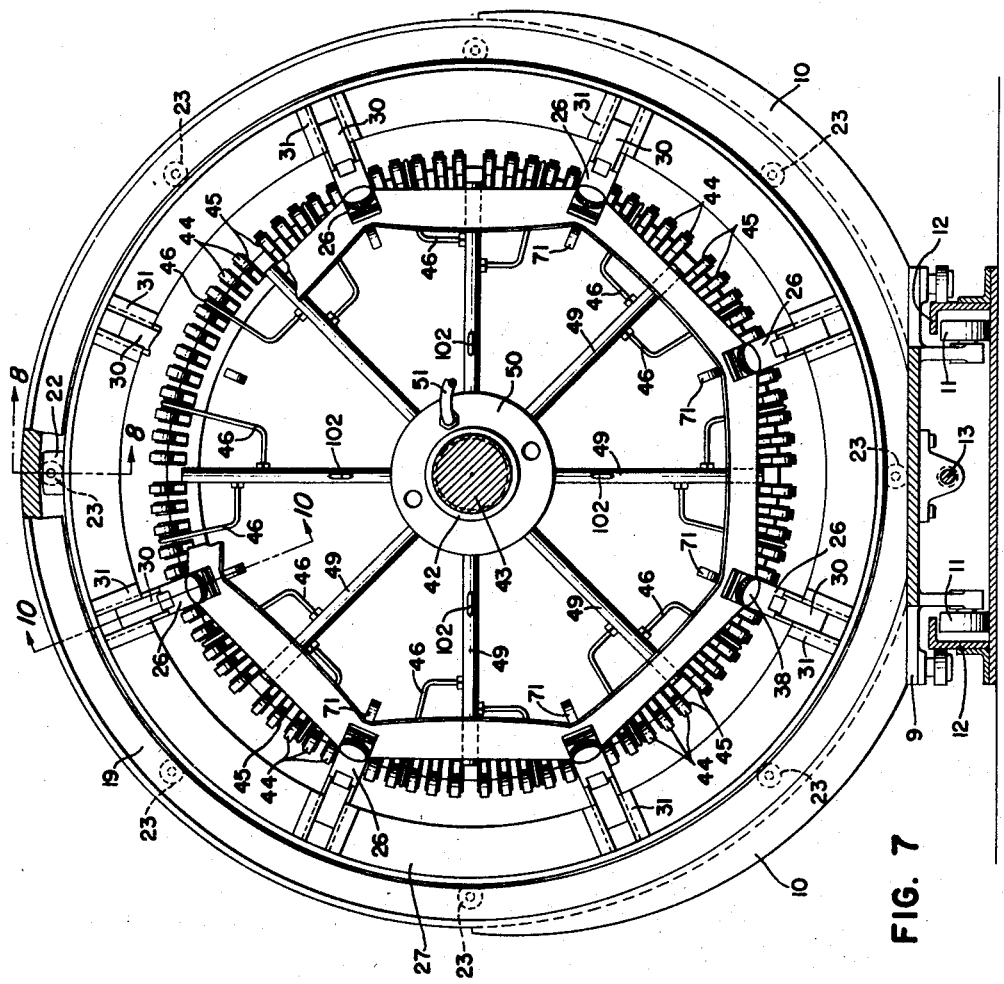
Fig. 7 is a cross section taken on the line 7—7 of Fig. 2.
Figure 8:
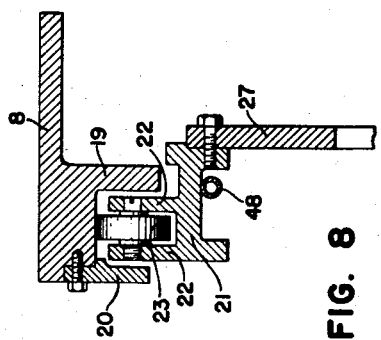
Fig. 8 is a fragmentary cross section taken along the line 8—8 of Fig. 7.

By the arrangement just described, clamping means is provided for clamping the edge of the fabric band at spaced points and in normal operation this clamping means may pivot in a plane extending through the axis of the ring and may be bodily adjustable in a radial direction for different drum diameters. As illustrated in Figs. 1, 2, 7 and 10, particularly with reference to Fig. 2, an expanding ring 41 is mounted on a sleeve 42 carried by the threaded end 43 of the main drum-carrying shaft 2 and suitably locked in fixed axial position closely adjacent the end of the tire-building drum so that the ring 41 and drum will rotate in unison but may be movable axially away from the end of the drum to permit the subsequent stitching of the fabric, extending beyond the end of the drum, against the end faces of the drum and around the tire beads, as in ordinary tire-building operations. On the periphery of the expanding ring 41 are a series of closely spaced rollers on anti-friction elements 44 rotatably mounted on brackets 45 carried by the expanding ring 41. The spacing is best illustrated in Fig. 7. The outermost portions of these rollers are preferably spaced radially from the axis of the drum a greater amount than the band-supporting surface of the drum. The radial distance of the rollers from the axis of the drum determines the amount the band will be stretched and the band should be stretched preferably to a size substantially larger than the diameter of the outer surface of the drum and sufficiently to provide a good clearance for the band with respect to the drum as the band is moved over the surface of the drum.

In order to insure that the band during its axial movement will not engage the drum or a previous band on the drum, it is desirable to provide a cushion of air between the band and the drum during the axial movement of the band over the drum. This is accomplished by means of a series of air jet tubes 46 and another series of air jet tubes 47, the former being mounted on the ring 41 and the latter being carried by and connected to the ring 21. The air jets carried by the ring 21 are all connected to a common conduit 48 mounted on the inner surface of the ring 21 and connected by any suitable means, such as a flexible hose, to a source of air pressure controlled by any suitable means for delivering air under pressure through the jet tubes 47. The term "air pressure" as used in the specification and claims means super-atmospheric presture. Similarly the jet tubes 46 are connected as illustrated in Fig. 7 to radial conduits 49, all mounted on a hollow chamber 50 and in communication with the interior thereof. This chamber is connected by an air conduit 51 through a detachable coupling means 52 with a conduit 53 carried by the band-holding mechanism 4. (Fig. 6.) The coupling 52 is for the purpose of detachably holding the conduits 51 and 53 in communication during the time the band-holding mechanism is in alignment with the axis of the drum and for the purpose of permitting detachment of the conduits 51 and 53 when it becomes necessary to move the band-holding mechanism from its operative position with respect to the drum. Means, not shown, may be provided for causing the air to flow through the jet tubes 46 and 47 during the interval that the band is being moved over the drum and this means is preferably automatically controlled so that when the band starts its movement from the position shown in Fig. 2 to its position over the drum the air will be caused to flow through the jet tubes, preferably for the entire time the band is being moved over the drum.

Without for the present describing the means for positioning the band in axial alignment with the building drum, it will be noted that with the band positioned as shown in Fig. 2, the spaced clamps may be operated by the tire builder to clamp the edges of the band at eight points peripherally thereof. The clamping force should be sufficient to withstand the force exerted in pulling the band over the drum. The clamps 26 are freely pivoted and, as the ring 8 is moved to the left in Fig. 2 or Fig. 10, the under sides of the clamps engage the rollers 44 and are caused to be pivoted outwardly into positions at lesser angles to the axis of the drum, at the same time causing the band to be stretched at the edge. As the ring 8 commences its movement to the left the rollers 44 also engage the inner surface of the band and as the ring 8 continues its movement to the left the rollers 44 continue to progressively expand the band at a multiplicity of points peripherally thereof to secure uniform stretch of the band throughout the periphery thereof. At the same time, the air supplied by the jet tubes 46 and 47 form a cushion between the band and the tire-building drum to hold the band in spaced relation thereto.

After the band has been centered over the drum so that the opposite edges thereof project axially the required amounts beyond the end faces of the drum, the advance of the ring 8 to the left is discontinued either automatically or manually and the clamps are released and moved to a position such as illustrated in the dotted lines in Fig. 10 so that, when the ring is returned to the right for the purpose of applying a second or succeeding band, the clamps will clear the drum and any previously applied bands.

Truck tires, particularly, are made up of a great number of plies and generally the bands used are of two-ply construction with each ply having the cords therein extending at opposite angles with respect to each other, the angles being determined by the angles desired for cords in the completed tire. Previous methods have been employed for applying such single bands but mainly these bands have been mounted on the drums in such a manner as to make it impractical to apply more than two plies at one time, particularly when the stretching is done by the operator, as by means of a stick impinged against the inner surface of the band as the tire drum rotates. This manual stretching of the edge of the band over the edge of the drum requires considerable physical effort and two bands are about all that an operator can handle in a single operation. With this invention, however, bands of six, eight, and even twelve plies, may be applied to the drum in one operation and it is a simple matter to make bands of these numbers of plies by suitable band-building machines well known in the industry and while the fabric is in its unstretched condition. When a band is made up of more than two plies for the larger sizes of truck tires, the weight of the band becomes excessive and stretching more difficult and in a tire which has a cross section of about 24" and a bead diameter of 29", the weight of six plies of fabric is between 125 and 150 pounds, making it very difficult for a single operator to handle. In addition, the greater the number of plies, the greater the required effort to expand the band. There is a physical limitation on an operator in expanding the band manually and it is for this reason that the present invention was made so that bands of six or more plies could be applied to the drum while at the same time making it possible for normal-size bands of two plies to be applied with equal facility and without the exhaustive efforts required of an operator in applying the band manually. By applying bands with a larger number of plies, it is possible to also lessen the stitching operations required after the bands are applied.

While it is possible to position the band in an axial position adjacent the end thereof and attach it to the clamps 26 while so positioned if a sufficient number of operators or helpers could be used, it is obvious that best results can be obtained by providing a suitable band-holding means for this purpose. It is for this purpose that the invention includes the band-holding mechanism indicated generally at 4 and the construction of this mechanism is best illustrated generally in Fig. 1 and more specifically in the cross section in Figs. 3, 4, 5 and 6. The sleeve 7 carries an air-controlled cylinder 54 at one end thereof and has two sleeves 55 mounted for sliding but non-rotative movement thereon and each of these sleeves is provided with a raceway 56 on the outer periphery thereof and each of these raceways in turn has radial flanges 57 at the opposite edges thereof. Between the flanges 57 on each sleeve, there is provided a ring 58 which is suitably mounted for rotation on the sleeves and guided by means of pairs of rollers spaced peripherally thereabout, such as the rollers 59 aand 60, the former being mounted on horizontal axes and the latter being mounted on radially extending axes as is more clearly illustrated in Fig. 6. The details of this mounting are not material, but it is preferred to have some type of anti-friction means for guiding the rings 58.

Each of the rings 58 have bosses 61 at diametrically opposite points for the reception of the tubes 62, which in turn support the slidable rods 63, the ends of which are connected to a yoke 64 by means of suitable nuts on the threaded ends of the rods 63. Each of the tubes 62 is provided with a slot 65 in which the pins 66, extending radially into the rods 63, are adapted to slide and the ends of the slot limit the sliding movement of the rods 63.

Also mounted on the rings 58 are a plurality of arms 67 pivoted at 68 to the lugs 68A on the rings 58 and, at 69, to the longitudinally parallel rails 70. On the outer surface of each of the rails 70 are a series of rollers 71 having their axes in a plane perpendicular to the radial plane containing the axis of the sleeve or hollow shaft 7. These rollers support the band and provide for the easy application and removal of the band. In order to make the rails adjustable radially to receive bands of different diameters, a series of shafts, parallel to the sleeve 7 are spaced circumferentially about the sleeve and these are screw threaded into nuts 72A pivoted on the arms 67 at the right as viewed in Fig. 3 and the opposite ends of the shafts are rotatably mounted in bearings 73 pivoted on the brackets 74. The nuts 73A and adjacent sprockets 76A prevent longitudinal movement of the shafts 72 in the bearings 73 while permitting rotation of the shafts therein. A hand wheel 75 mounted on one of the shafts can be used to rotate that shaft and the other shafts are simultaneously rotated by any suitable gearing connecting said shafts. As shown in the drawings, the gearing comprises a series of chains 76 trained over sprockets 76A secured to each of the shafts whereby upon rotation of the shaft on which the hand wheel is mounted, the other shafts will be rotated simultaneously to rock all of the arms 67 and thus change the angles of those arms to move the rails 70 radially in or out as desired. In this way, bands of different diameters may be accommodated, but it is to be understood that if the device was to be used for a single size of tire all that would be necessary would be a series of fixed rails mounted on the rings 58.

When the band-holding device is in the position illustrated by full lines in Fig. 1, it is desirable, in fact it is necessary, to couple the rotatable portion of this device to the shaft that carries the tire-building drum so that it can be made to rotate in unison with the drum. Of course other means can be used for rotating the band-carrying device in unison with the rotation of the shaft on the drum without coupling the two together, but such means is not very practical and would require separate synchronized driving means, whereas as shown in the drawings the same means that drives the drum drives the band-carrying device.

In order to secure this coupling action, the yoke 64 carries a clutch plate 77 which, as illustrated in Fig. 6, is rigidly connected to the yoke 64 and takes its motion from the motion of the yoke or, conversely, if the clutch plate is rotated the yoke will rotate and, through the medium of the rods 63 and the sleeves 62 mounted on the rings 58, these rings, and consequently the rails 70, are caused to rotate. Means must be provided for coupling the clutch plate 77 to a similar clutch plate 78 on the end of the drum-carrying shaft. The faces of each of the clutch plates 77 and 78 are serrated or provided with other suitable interlocking means for accomplishing a direct drive between the drum shaft and the shaft of the band carrier. Means must be provided for moving the clutch plate 77 into engagement with the clutch plate 78 and this is readily accomplished by bodily moving the carrier to the left by any suitable means for causing the sleeves 55 to travel axially along the sleeve 7. As these sleeves 55 move to the left in Fig. 3 the rods 63 also move therewith because of the friction between the tubes 62 and the rods 63 mounted for sliding movement therein. These rods move the clutch plate 77 into engagement with the clutch plate 78 and thereafter the tubes 62 continue their movement by sliding along the rods 63. When the pins 66 on the rods 63 reach the right-hand end of the slots in the tubes 62 the rods are then forced positively to the left to cause a positive gripping action between the clutch plates 77 and 78 and this at the same time limits the amount of movement that can be given the carrier in that direction. As long as the clutch plates are in engagement, the carrier will rotates with the drum shaft and the drum.

In order to provide means for moving the sleeve 55, one of these sleeves (at the left in Fig. 3) is provided, as best illustrated in Fig. 6, with pins 79 connected to the end of a piston shaft 80 and these pins extend through the diametrically opposed slots 81 in the sleeve 7. It is only necessary to connect the one sleeve 55 to the piston as the other sleeve is caused to move therewith because of the tubes 62 which connect the rings 58.

The piston shaft 80 extends through the sleeve 7 into the piston cylinder 54 and is provided with a piston 82. The piston is operated by any suitable means and, as diagrammatically shown, two supply pipes 83 and 84 supply the opposite ends of the cylinder 54 with air or any other suitable fluid controlled by a valve 85 for supplying air or other fluid to the desired end of the cylinder. This cylinder, of course, moves the carrier from right to left or left to right as desired.

On the movement of the band carrier to the right after the application of a band to the drum, the clutch plates 77 are disengaged again because of the friction between the rods 63 and the sleeve 62 but, after the yoke 64 contacts the end of the sleeve 7 after a short travel thereof, the carrier continues its movement to the right and the pins 66 slide in the slots 65 to the left-hand end of the slots as illustrated in Fig. 3.

Previously in connection with the description of the jet tubes 46, it was explained that the conduit 53 supplied the air and must be connected and disconnected to the conduit 51. The conduit 53 is carried by the yoke 64 as shown in Fig. 3 and is connected as shown in Fig. 6 to a chamber 86 mounted on the yoke 64, which in turn has a conduit 87 connected thereto and this is rotatable within a conduit 88 mounted in fixed relation on the end of the sleeve 7. This insures that during the rotation of the carrier on the sleeve the air will be supplied to the air jets. The conduit 88 is connected by means of a flexible hose 89 lying within the sleeve 7, as shown in dotted lines in Fig. 3, and this is of such a length as to provide a looped portion 90 lying within the sleeve 7 with the other end of the hose connected to an air supply 91 by means of a conduit 92 extending through the sleeve and fixed thereto. The purpose of the looped portion is to permit the sliding of the carrier along the sleeve 7. However, any suitable means for supplying air pressure to the air jets other than shown is considered to be within the purview of the invention.

A convenient method of mounting the band on the carrier is to provide a support adjacent the end of the carrier when the carrier is in the position shown in dotted lines in Fig. 1. The yoke 64 has a bracket 93 extending upwardly therefrom and this bracket carries a rod 94 vertically adjustable in a bracket 95 thereon and at the upper end of the rod there is provided a support 96 having a radially extending abutment 97 and a pair of rollers 98 to provide a cradle to support a rod 99. The rollers permit rotation of the rod 99 for a purpose to be explained.

The bands are looped over a rod 99 separate from the machine, and this rod is then raised so that one end is supported on the rollers 98 and the other end on a fixed support (not shown) also carrying a plurality of rollers. The operator or operators, preferably two, may then spread the band over the rails and, by pulling on the end of the band, cause the band to slide easily over the carrier until it is positioned substantially as shown in Fig. 3. The rollers supporting the ends of the rod 99 permit the rod to rotate during the application of the band. It is only necessary that the rails 70 be arranged at a radial position such that the band has a loose fit because it is understood that this is merely a positioning device for supplying the band to the tire-building drum. However, it is conceivable that at least some stretching of the band could be accomplished by the carrier.

After the band is mounted on the carrier, air is admitted to the cylinder 54 to move the carrier to the left and bring the clutch 77 into engagement with the clutch plate 78, with the continued operation of the piston effecting a further travel of the carrier to a position such as shown in Fig. 2 in which the projecting edge of the band is adjacent the clamps 26. These clamps are then applied as previously described. In order to do this conveniently the drum, and as a consequence the carrier, may be rotated to position the clamps in convenient locations so that two operators, one at opposite sides of the mechanism, can attach opposing clamps simultaneously and then index the drum and the band to clamp other portions until all the clamps are attached.

Next the drum is caused to rotate at a relatively high rate of speed and of course the carrier rotates simultaneously therewith. The ring 8 is simultaneously caused to move to the left to carry the band over the drum and through the combined effect of the centrifugal action on the band due to the rotation thereof, the pivoting of the clamps and the engagement of the rollers with the inside of the band, that band is caused to be stretched to a diameter larger than the drum and the ring 8 carries it over the drum on a cushion of air provided by the jet conduits 46 and 47. The rotation of the band helps to prevent contact of the band with the surface of the drum while it is being drawn over the drum and, while it is preferable to rotate the carrier and drum in unison because of the superior results obtained by doing so, it is believed to be within the purview of this invention to draw the band over the drum without the rotation of either the band or the drum.

After the band has reached its ultimate positions, the clamps are released and moved to the dotted-line position shown in Fig. 10, after which the ring 8 may be moved to the left or right, clear of the drum while the band is stitched. The band carrier is next moved axially to uncouple it from the drum shaft. Then the carrier is ready to receive another band for the tire being made or for another tire as the case may be. The operator then proceeds to stitch the material to the drum or to a previous band and complete the tire-building operations in any desired manner.

The ring applicator can be removed manually but I have illustrated in Fig. 6 cables 100 having hooks 101 which engage eyes 102 (Fig. 7) on the ring applicator, whereby when the band carrier is retracted it pulls the ring applicator away from the building drum after the ring is released from the drum shaft.

The band carrier 4 can be made adjustable vertically on post 5 and for this purpose in Fig. 3 I have shown a fluid cylinder 103 having a piston 104 engaging a flange 105 on sleeve 6, a valve 106 being used to regulate the fluid flow to and from the cylinder.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. In a band-applying device for applying a tire band to a tire-building drum, the combination with a support having a plurality of concentrically mounted clamps arranged thereon with the clamping portions mounted for movement freely from a position in which the ends of the clamping means are within the projected tire building surface of the drum to a position exterior thereof, means for guiding and moving the support axially of the drum, said support being constructed and guided to clear the surface of the drum as the support moves the clamping means axially over the drum and means for moving said clamps from a position inwardly to a position outwardly of said projected surface, said last mentioned means also engaging successive portions of the band axially disposed with reference to the clamps and thereafter successively and progressively thereafter expanding the band as the clamps draw the band over the drum and said successive portions are presented to said last mentioned means.

2. In a band-applying device for applying a tire band to a tire-building drum, the combination with a support having a plurality of concentrically mounted clamps arranged thereon with the clamping portions mounted for movement freely from a position in which the ends of the clamping means are within the projected tire building surface of the drum to a position exterior thereof, expanding means for moving said clamps from said first to said second position and means for guiding and moving the support axially of the drum, said support being constructed and guided to clear the surface of the drum as the support moves the clamping means axially over the drum, said expanding means comprising a series of rollers with their axes generally tangent to the extended curved surface of the drum and arranged adjacent the end of said drum.

3. Means for applying a band to a rotatable tire-building drum, comprising a clamp support, means for guiding said support generally parallel to the axis of said drum, means for advancing the support along said guiding means, clamps on said support spaced at intervals circumferentially of said support having jaws for positively gripping the edge of a band to be applied to said drum, and means arranged adjacent the end of the drum for engaging successive portions of the interior of the band as it is moved by said clamps toward said drum for progressively expanding the band to a size to slip readily over the drum.

4. The method of applying an annular tire-building band of a circumferential dimension less than the outer circumferential dimension of a tire-building drum on which it is to be mounted, comprising the steps of positioning the band in substantially concentric relation with the axis of the drum and adjacent one end of the drum, gripping the edge of the band adjacent the drum at a plurality of positions circumferentially of the edge and moving the gripped portions simultaneously radially outwardly and axially over the drum while at the same time applying an expanding force to the inner surface of the band near the edge of the drum to effect the expanding of successive portions of the band progressively from one end thereof to the other as the said successive portions are presented adjacent said drum and while the band is being pulled over the drum.

5. A method as set forth in claim 4 in which a cushion of air at super-atmospheric pressure is maintained between the surface of the drum and the band being applied, to relieve frictional contact between the two while the band is being applied to the drum.

6. A method as set forth in claim 4 in which a cushion of air at super-atmospheric pressure is maintained between the surface of the drum and the band being applied, to relieve frictional contact between the two while the band is being applied to the drum, and in which the drum and band are rotated in unison while the band is being pulled over the drum.

7. The method of applying a tire-building band of a circumferential dimension less than the outer circumferential dimension of a tire-building drum on which it is to be mounted, comprising the steps of positioning the band in substantially concentric relation with the axis of the drum and adjacent one end of the drum, positively gripping the edge of the band adjacent the drum at a plurality of positions circumferentially of the edge, and moving the gripped portions simultaneously outwardly and axially over the drum while at the same time applying an expanding force to the inner surface of the band at a multiplicity of circumferentially spaced positions to effect the expanding of successive portions of the band as the band is pulled over said drum to thereby expand the band progressively from one end thereof toward the other.

8. The method of applying a tire-building band of a circumferential dimension less than the outer circumferential dimension of a tire-building drum on which it is to be mounted, comprising the steps of positioning the band in substantially concentric relation with the axis of the drum and adjacent one end of the drum, gripping the edge of the band adjacent the drum at a plurality of positions circumferentially of the edge, and moving the gripped portions simultaneously outwardly and axially over the drum while at the same time applying an expanding force to the inner surface of the band at a multiplicity of circumferentially spaced positions simultaneously to effect the expanding of successive portions of the band as the band is pulled over said drum to thereby expand the band progressively from one end thereof toward the other.

9. The method of applying a band to a tire-building drum in which the band is of smaller circumferential length than that of the outer surface of the drum, which comprises the steps of positioning the band adjacent one end of said drum in substantially coaxial relationship therewith but not over the drum and gripping the edge of the band adjacent the drum and stretching said edge to a diameter greater than the outer diameter of the drum whereby said edge may encompass the drum, and then moving said expanded edge over the drum while progressively expanding successive contiguous portions of the band to the same diameter while moving the band axially over the drum surface into tire-building position around said drum.

10. A band support for supporting a band in position to mount it on a tire-building drum, comprising a vertical support, a frame mounted to rotate on said support in a horizontal plane, a hollow cylinder carried by said frame and extending generally horizontal, spaced raceways encircling said cylinder and mounted for sliding but non-rotative movement therealong, a band support rotatably mounted on said raceways and means for moving said band support longitudinally along said hollow cylinder.

11. Apparatus as set forth in claim 10 in which a clutch element is mounted for sliding movement axially of said cylinder for coupling said cylinder to a clutch element on a shaft of a tire-building drum, and means coupling said first clutch element to said band support to cause said clutch to move with said band support into engagement with the clutch on said drum shaft.

12. Apparatus as set forth in claim 10 in which a clutch element is mounted for sliding movement axially of said cylinder for coupling said cylinder to a clutch element over a shaft of a tire-building drum, and means coupling said first clutch element to said band support to cause said clutch to move with said band support into engagement with the clutch on said drum shaft, said coupling means between said band support and first clutch element including a lost-motion connection whereby when the band support is moved the clutch is first moved into operative position and thereafter the support continues its movement into juxtaposition adjacent the end of said drum while the said first clutch element remains stationary.

13. Apparatus as set forth in claim 12 in which the band support, as it moves into final operative position positively forces the clutch into firm engagement with the clutch element on the drum shaft of the tire-building machine.

14. Apparatus for applying a circumferentially stretchable tire band to a tire building drum in which the band is initially of a lesser inner circumferential length than the outer circumferential length of the drum, said means comprising a clamp support mounted for movement axially of said drum, a series of spaced radially movable clamps mounted on said support and each provided with spaced jaws for clamping an edge of the band adjacent the drum therebetween and at spaced points along said edge, means for moving said support axially of the tire building drum to advance the clamps toward and over the drum surface, and means for simultaneously moving the clamps radially outward to stretch the edge of the band to a circumferential dimension at least as great as that of the drum so that said edge may encompass the drum to start the band over the drum, and means at the edge of the drum for expanding the circumference of successive portions of the band, not expanded by the clamps, as the support moves the clamps over the drum and as said successive portions are progressively moved into engagement with said expanding means.

15. Apparatus as set forth in claim 14 in which said clamp support is mounted for movement parallel to the axis of the drum and is constructed to clear said drum as said clamps are moved over said drum to draw the band thereover.

16. Apparatus as set forth in claim 14 in which said clamp support comprises a ring of an inside diameter greater than the outer diameter of the drum so as to enable the ring to pass freely over said drum, and in which said support is mounted for movement from one end of the drum to the other.

17. Apparatus as set forth in claim 16 which includes a supporting ring for the clamp support on which the clamp support is rotatably mounted and in which there is means coupling the clamp support and drum.

18. Apparatus as set forth in claim 14 in which said last mentioned means is positioned to also engage the inner surface of the band and progressively stretch the same to a circumferential dimension at least as great as that of the drum as the clamps draw the edge of the band over the drum, said means for expanding successive portions of the band also acting as means to move said clamps initially outward as herein set forth.

19. In a tire building apparatus, the combination with a shaft, of a tire building drum mounted on said shaft, means for rotating said shaft, a band-carrying and supplying mechanism comprising a second shaft, a band supporting member including a plurality of axially extending series of rotatable bearings each series being parallel to said second shaft and supported thereby and each said series being spaced circumferentially about the second shaft from an adjacent series, said bearings having rotatable movement in a direction such that the outer surfaces may move in a general direction parallel to the axis of said shaft, a clutch member on the end of said drum shaft and mounted thereon to rotate therewith, a similar clutch member on said second shaft and similarly mounted thereon but having relative movement with respect to said other clutch member for engaging the same, means for moving said clutch members into engagement with each other to cause said shaft to be coupled for rotation in unison, means for expanding a band while mounted on said supporting mechanism, and means for pulling said expanded band over the surface of said drum.

20. The combination set forth in claim 19 in which there is means for supplying air under pressure between the band and the drum as the band is moved over said drum.

21. In a tire-building machine comprising a tire-building drum and a band-applying device for applying a tire band to said drum said band-applying device being mounted adjacent one end of said drum and including a support carrying an annular series of spaced clamping means each having opposed clamping jaws for positively gripping and holding the edge of a band at spaced positions circumferentially of said edge, said support being mounted for movement parallel to the axis of said drum, and said clamps being mounted on said support for movement to and from positions where said jaws are within the projected surface and positions outside of said projected surface whereby after the band is clamped by said jaws and while said clamps are in the said first position inwardly of the projecting surface the clamps may be moved to said second position whereby only the edge of the band is stretched to a diameter greater than that of the drum and may pass over one end thereof, means for moving said support axially of the drum to move the clamps axially thereof, means for simultaneously moving the clamps radially to said second position, and additional means positioned adjacent the end of the drum for engaging the interior of the drum axially away from said clamped edge after the clamps have been expanded to expand successive portions of the band presented to said additional means as such successive portions are positioned adjacent said additional means during the movement of the band axially over the drum whereby portions of the band exclusive of the portions expanded by the clamping means are successively and progressively expanded to a diameter sufficient to permit the band to encompass the drum as the band is moved in a direction to do so.

22. Apparatus for applying a band to the outer surface of a tire-building drum mounted on a first shaft to rotate therewith comprising in combination with said drum and shaft, a second shaft, a band support mounted for rotation with said second shaft a second support movably mounted with said second shaft for movement to and from positions in alignment and not in alignment with the said first shaft, a clutch for coupling said shafts together when in alignment so that they will rotate in unison with each other, means on said first support for supporting a band and for expanding it progressively beginning at the edge nearest the drum and simultaneously with the movement of the band in an axial direction as the band is moved from said band support toward the drum, the band support including a plurality of series of elements with each series having rotatable anti-friction elements rotatable about an axis transverse to the direction of movement of the band when moving from the band support to the drum to thereby assist the movement of the band onto the drum.

23. Apparatus as set forth in claim 22 in which said elements are mounted for radial adjustment relative to said second shaft.

24. Apparatus as set forth in claim 22 in which the band-supporting means is slidably mounted on said second shaft to position the elements close to and remote from the end of the drum.

25. Apparatus as set forth in claim 22 including a removably mounted member arranged adjacent the end of the drum between the drum and the band support and having the outer periphery thereof provided with a series of rotatable anti-friction elements arranged in a circular arrangement such that their outer peripheries are projected beyond the outer periphery of the drum when said member is in operative position, the outer surface of said anti-friction elements being movable in a direction parallel to the axis of the drum as they rotate whereby to assist the movement of the band onto the drum.

26. The method of applying elongated tire bands of stretchable tire-building fabric to a tire-building drum in which the band is initially of a circumference materially less than the circumference of the drum and must be expanded to pass over the drum, comprising the steps of aligning the band and drum co-axially, gripping the edge of the band adjacent the drum only, expanding the said edge to a circumferential dimension sufficient to pass over the drum, thereafter drawing the band axially over said drum and while so doing expanding sequentially successive portions of the band, other than the edge, only at a position near the end of the drum, by a force applied internally of the band adjacent the end of the drum and as the band is progressively moved axially over the drum surface.

27. The method of applying a circumferentially stretchable tire band to a tire building drum in which the band is initially smaller in diameter than the drum, which comprises positioning the band in concentric aligned relation with the drum at one end thereof, gripping the edge of the band at the edge adjacent the drum and while so gripping the band expanding the gripped edge radially to a diameter greater than the diameter of the drum and then moving the expanded edge over the drum while successive portions of the band are progressively expanded radially to a diameter greater than that of the drum, and characterized in that the expansion of successive portions occurs only closely adjacent the end of the drum and the expansion of each successive portion is from its initial diameter to a diameter greater than that of the drum in only a short period of travel as compared to the length of the band.

References Cited in the file of this patent

UNITED STATES PATENTS

| | | |
|---|---|---|
| 1,441,767 | Williams | Jan. 9, 1923 |
| 1,467,143 | Denmire | Sept. 4, 1923 |
| 1,499,679 | Midgley | July 1, 1924 |
| 1,667,263 | Mather | Apr. 24, 1928 |
| 1,669,053 | Hamel | May 8, 1928 |
| 1,755,933 | Pfeiffer | Apr. 22, 1930 |
| 1,787,423 | Humphrey | Dec. 30, 1930 |
| 2,517,889 | Kuffler | Aug. 8, 1950 |
| 2,609,311 | Engler | Sept. 2, 1952 |
| 2,645,004 | Dorner | July 14, 1953 |

FOREIGN PATENTS

| | | |
|---|---|---|
| 560,934 | Great Britain | Apr. 27, 1944 |
| 194,238 | Switzerland | Feb. 16, 1938 |